(12) United States Patent
Kim et al.

(10) Patent No.: US 12,073,768 B2
(45) Date of Patent: Aug. 27, 2024

(54) DISPLAY APPARATUS AND DATA TRANSMISSION METHODS THEREOF

(71) Applicant: Sapien Semiconductors Inc., Seoul (KR)

(72) Inventors: Do Kyung Kim, Seoul (KR); Hyun Tae Jung, Seoul (KR); Jong Gu Jeon, Seoul (KR); Dae Young Jung, Seoul (KR)

(73) Assignee: Sapien Semiconductors Inc., Seoul (KR)

( * ) Notice: Subject to any disclaimer, the term of this patent is extended or adjusted under 35 U.S.C. 154(b) by 0 days.

(21) Appl. No.: 18/349,532

(22) Filed: Jul. 10, 2023

(65) Prior Publication Data

US 2024/0038138 A1 Feb. 1, 2024

(30) Foreign Application Priority Data

Jul. 29, 2022 (KR) .................. 10-2022-0094378
Oct. 18, 2022 (KR) .................. 10-2022-0134053

(51) Int. Cl.
*G09G 3/20* (2006.01)
*G06F 13/42* (2006.01)

(52) U.S. Cl.
CPC ....... *G09G 3/2096* (2013.01); *G06F 13/4282* (2013.01); *G06F 2213/0002* (2013.01); *G09G 2370/00* (2013.01)

(58) Field of Classification Search
CPC .. G09G 5/006; G09G 2310/08; G09G 3/2096; G09G 2370/10; G09G 2340/0435; G09G 2370/08; G09G 3/2092; G09G 2370/00; G09G 5/008; G09G 2320/103; G06F 13/4282; G06F 2213/0002
See application file for complete search history.

(56) References Cited

U.S. PATENT DOCUMENTS

| | | | |
|---|---|---|---|
| 2015/0138212 A1* | 5/2015 | Bae ................. | G09G 5/006 345/520 |
| 2018/0052752 A1* | 2/2018 | Takla .............. | G06F 11/221 |
| 2018/0275713 A1* | 9/2018 | Srivastava ....... | G06F 13/4291 |

(Continued)

FOREIGN PATENT DOCUMENTS

| | | |
|---|---|---|
| JP | 6569743 B2 | 9/2019 |
| KR | 102189928 B1 | 12/2020 |
| KR | 10-2022-0009733 A | 1/2022 |

OTHER PUBLICATIONS

Office Action issued in the Korean Patent Office on Mar. 22, 2024, issued in corresponding Korean Application No. 10-2022-0134053.

*Primary Examiner* — Koosha Sharifi-Tafreshi
(74) *Attorney, Agent, or Firm* — Sughrue Mion, PLLC

(57) ABSTRACT

A display driving apparatus transmitting data to each of a plurality of display driver integrated circuits (ICs) through a mobile industry processor interface (MIPI) using a point-to-multipoint (multi-drop) manner and a data transmission method thereof, the method may obtain display data and command data, transmit the display data and the command data to each of a plurality of display driver ICs through a MIPI using a point-to-multipoint (multi-drop) manner, and independently control sub-pixels corresponding to each of the plurality of display driver ICs based on the display data and the command data.

10 Claims, 11 Drawing Sheets

(56) References Cited

U.S. PATENT DOCUMENTS

2022/0417064 A1\* 12/2022 Han .................... H04L 25/0282
2023/0022217 A1\* 1/2023 Kyles ..................... G09G 5/003
2023/0350841 A1\* 11/2023 Graif ................... G06F 13/4072

\* cited by examiner

DISPLAY APPARATUS AND DATA TRANSMISSION METHODS THEREOF

CROSS-REFERENCE TO RELATED APPLICATION

This application is based on and claims priority under 35 U.S.C. § 119 to Korean Patent Applications No. 10-2022-0094378, filed on Jul. 29, 2022 and No. 10-2022-0134053, filed on Oct. 18, 2022, in the Korean Intellectual Property Office, the disclosure of which is incorporated by reference herein in its entirety.

BACKGROUND

1. Field

The present disclosure relates to a display apparatus and a data transmission method thereof.

2. Description of the Related Art

As the information society develops, the demand for display apparatus for displaying images is increasing in various forms, and various types of display apparatus such as liquid crystal display apparatus and organic light emitting display apparatus are being utilized.

In addition, a display apparatus capable of touch-type input processing is provided according to user convenience and device characteristics. The display apparatus capable of touch-type input processing is applied to various electronic devices such as notebooks, monitors, and home appliances as well as portable terminals such as smart terminals.

In a conventional display apparatus, an interface of a conventional monochrome backplane drives a display by using a serial peripheral interface (SPI) or a Quad-SPI (QSPI). However, since the SPI and the Quad-SPI have limitations on data transmission speed, it is only possible to realize a speed of up to several tens of Mbps, and the display apparatus driven in this way is driven at a low resolution and low frame rate.

In order to drive the display apparatus with high resolution and high frame rate, it is necessary to implement a speed of up to several hundred Mbps to several Gbps, but the speed of up to several hundred Mbps to several Gbps may not implemented by the conventional display apparatus still using the SPI and the Quad-SPI.

The foregoing background art is technical information that the inventor possesses for derivation of the present disclosure or acquired in the process of deriving the present disclosure, and cannot be said to be known technology disclosed to the general public prior to filing the present disclosure.

SUMMARY

A purpose of the present disclosure is to provide a display driving apparatus transmitting data to each of a plurality of display driver integrated circuits (ICs) through a mobile industry processor interface (MIPI) using a point-to-multipoint (multi-drop) manner and a data transmission method thereof.

The purpose to be solved by the present disclosure is not limited to the purpose mentioned above, and other objects and advantages of the present disclosure that have not been mentioned may be understood by the following description and will be more clearly understood by examples of the present disclosure. In addition, it will be appreciated that the objects and advantages of the present disclosure may be realized by means and combinations thereof shown in the claims.

Additional aspects will be set forth in part in the description which follows and, in part, will be apparent from the description, or may be learned by practice of the presented embodiments of the disclosure.

As a technical means for achieving the above object, a first aspect of the present disclosure may provide a method including obtaining display data and command data, transmitting the display data and the command data to each of a plurality of display driver ICs (IC) through a MIPI using a point-to-multipoint (multi-drop) manner, and independently controlling sub-pixels corresponding to each of the plurality of display driver ICs based on the display data and the command data.

A second aspect of the present disclosure may provide a display driving apparatus including a plurality of display driver ICs that independently control each of a plurality of sub-pixels based on display data and command data, wherein the plurality of display driver ICs receive the display data and the command data through a MIPI using a point-to-multipoint (multi-drop) manner.

In addition to this, another method for implementing the present disclosure, another system, and a computer-readable recording medium storing a computer program for executing the method may be further provided.

Other aspects, features and advantages other than those described above will become apparent from the following drawings, claims and detailed description of the invention.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
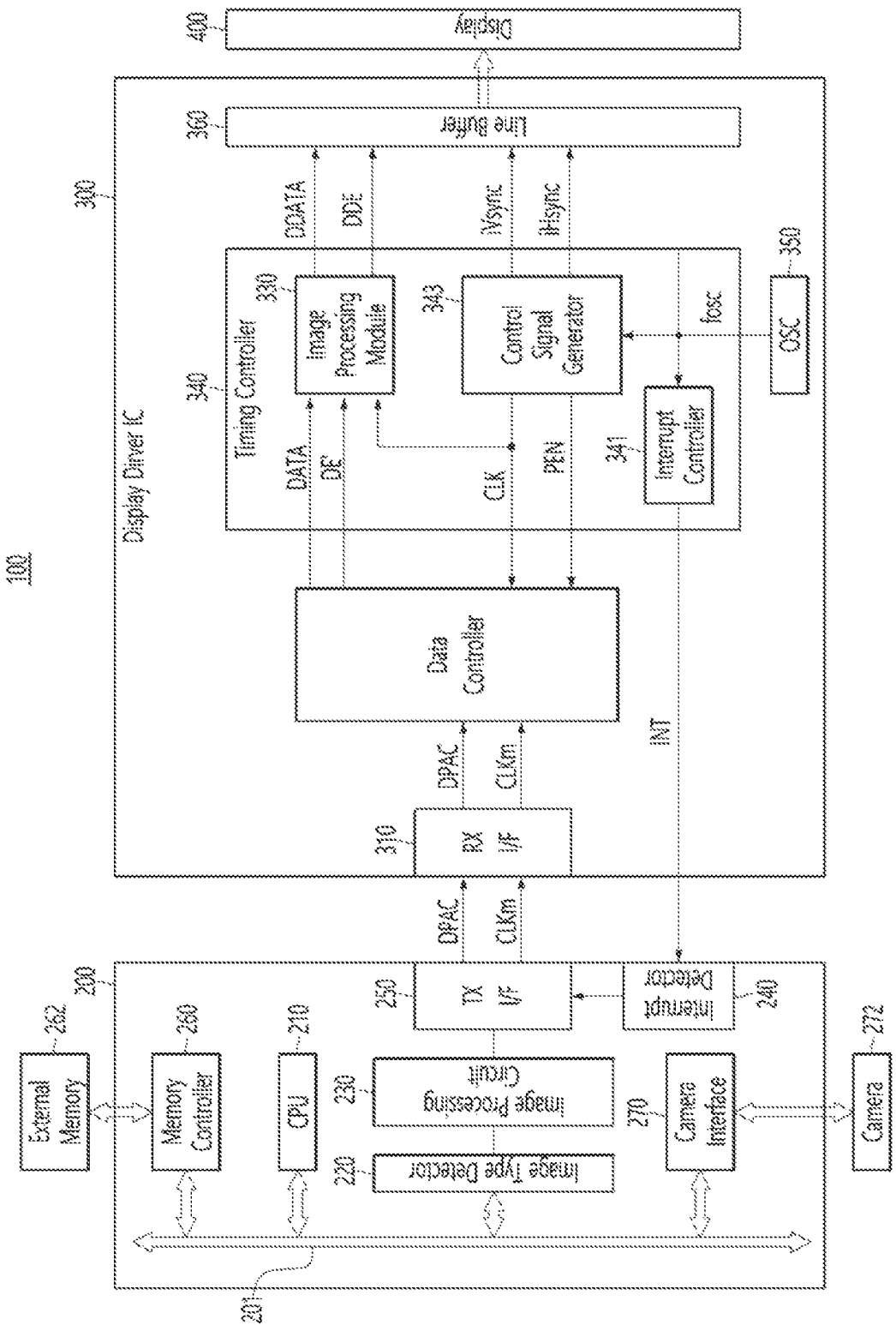
FIG. 1A is a block diagram for explaining an example of a data processing system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the present disclosure will be described in conjunction with the accompanying drawings. Various embodiments of the present disclosure may have various changes and various embodiments, and specific embodiments are illustrated in the drawings and related detailed descriptions are described. However, this is not intended to limit the various embodiments of the present disclosure to specific embodiments, and should be understood to include all changes and/or equivalents or substitutes included in the spirit and technical scope of the various embodiments of the present disclosure. In connection with the description of the drawings, like reference numerals have been used for like elements.

Expressions such as "include" or "may include" that may be used in various embodiments of the present disclosure indicate the presence of disclosed functions, operations, or components, and may include one or more additional functions, operations, or components. components, etc. are not limited. In addition, in various embodiments of the present disclosure, terms such as "include" or "have" are intended to designate that there are features, numbers, operations, operations, components, parts, or combinations thereof described in the specification, it should be understood that it does not preclude the possibility of the presence or addition of one or more other features, numbers, operations, operations, components, parts, or combinations thereof.

In various embodiments of this disclosure, expressions such as "or" include any and all combinations of the words listed together. For example, "A or B" may include A, may include B, or may include both A and B.

Expressions such as "first", "second" used in various embodiments of the present disclosure may modify various components of various embodiments, but do not limit the components. For example, the above expressions do not limit the order and/or importance of corresponding components. The above expressions may be used to distinguish one component from another. For example, both the first user device and the second user device are user devices and represent different user devices. For example, a first element may be termed a second element, and similarly, a second element may also be termed a first element, without departing from the scope of rights of various embodiments of the present disclosure.

When an element is referred to as being "connected" or "accessed" to another element, the element may be directly connected or connected to the other element, but not with the other element, it should be understood that other new components may exist between the other components. On the other hand, when an element is referred to as being "directly connected" or "directly accessed" to another element, it will be understood that no new element exists between the element and the other element.

In the embodiments of the present disclosure, terms such as "module," "unit," and "part" are terms used to refer to components that perform at least one function or operation, and these components are hardware or software, it may be implemented or implemented as a combination of hardware and software. In addition, a plurality of "modules", "units", "parts", etc. are integrated into at least one module or chip so that at least one processor can be implemented, except for cases where each of them needs to be implemented as individual specific hardware.

Terms used in various embodiments of the present disclosure are only used to describe a specific embodiment, and are not intended to limit various embodiments of the present disclosure. Singular expressions include plural expressions unless the context clearly dictates otherwise.

Some embodiments of the present disclosure may be represented as functional block structures and various processing operations. Some or all of these functional blocks may be implemented as a varying number of hardware and/or software components that perform specific functions. For example, functional blocks of the present disclosure may be implemented by one or more microprocessors or circuit configurations for a predetermined function. Also, for example, the functional blocks of this disclosure may be implemented in various programming or scripting languages. Functional blocks may be implemented as an algorithm running on one or more processors. In addition, the present disclosure may employ prior art for electronic environment setting, signal processing, and/or data processing. Terms such as "mechanism", "element", "means" and "component" may be used broadly and are not limited to mechanical and physical components.

In addition, connecting lines or connecting members between components shown in the drawings are only examples of functional connections and/or physical or circuit connections. In an actual device, connections between components may be represented by various functional connections, physical connections, or circuit connections that can be replaced or added.

Unless defined otherwise, all terms used herein, including technical or scientific terms, have the same meaning as commonly understood by one of ordinary skill in the art to which various embodiments of the present disclosure belong.

Terms such as those defined in commonly used dictionaries should be interpreted as having a meaning consistent with the meaning in the context of the related art, and should not be interpreted in an idealized or overly formal sense unless explicitly defined in various embodiments of the present disclosure.

Hereinafter, various embodiments of the present disclosure will be described in detail using the accompanying drawings.

FIG. 1A is a block diagram for explaining an example of a data processing system according to an embodiment.

Referring to FIG. 1A, a data processing system 100 includes a host 200, an external memory 262, a camera 272, a display driver integrated circuit (IC) 300 and a display panel 400. In this specification, the display driver IC 300 and the display panel 400 are collectively referred to as a display driving apparatus.

The data processing system 100 means a system capable of processing a video stream (e.g., still display data or moving display data) and displaying the processed video stream (or display data) on a display panel 400.

The data processing system 100 may be implemented as a smartphone, a tablet personal computer, a digital camera, a camcorder, a personal digital assistant (PDA), a portable multimedia player (PMP), a mobile internet device (MID), VR/AR/XR device or a wearable computer, but is not limited thereto.

The host 200 may support a video stream interface. Here, supporting the video stream interface means a case in which the host 200 supports the video stream interface in hardware, or a case in which the host 200 supports the video stream interface in hardware by a firmware (or software) that drives the host 200. As an example, when the host 200 supports only a mobile industry processor interface (MIPI) video mode, the data processing system 100 may support the video stream interface. As another example, when the host 200 may support both the MIPI video mode and a MIPI command mode, and the host 200 is configured to support only the MIPI video mode by the firmware (or software), the data processing system 100 may support the video stream interface.

Meanwhile, the host 200 may control the display driver IC 300.

The host 200 may be implemented as a system on chip (SoC), an application processor (AP), or a mobile application processor.

The host 200 includes a bus 201, a central processing unit (CPU) 210, an image type detector 220, an image processing circuit 230, an interrupt detector 240, a transmission interface 250, a memory controller 260 and a camera interface 270.

The central processing unit 210 may control each component 220, 230, 240, 250, 260 and/or 270 through the bus 201.

The central processing unit 210 may execute the firmware (or software) capable of configuring the host 200 so that the host 200 supports the video stream interface. The firmware may be loaded into the host 200 from the external memory 262. As an example, the central processing unit 210 may include one or more cores.

The image type detector 220 determines whether the image data to be transmitted to the display driver IC 300 is still image data or moving image data, and may control the transmission of the image data (also referred to as display data) depending on the result of the determination. That is, the image type detector 220 may determine whether to transmit the image data to the image processing circuit 230.

For example, when image data output from an image data source 262 or 272 is the still image data, the image type detector 220 may transmit the image data to the image processing circuit 230.

As another example, when the image data output from the image data source 262 or 272 is the moving image data, the image type detector 220 may transmit the image data to the image processing circuit 230.

Therefore, since the image type detector 220 may send only image data that needs to be transmitted to the display driver IC 300 (or image data that needs to be updated in the display panel 400) to the image processing circuit 230, the image type detector 220 may prevent transmission of unnecessary image data.

FIG. 1A illustrates an embodiment in which the image type detector 220 is disposed between the bus 201 and the image processing circuit 230, but the image processing circuit 230 may be disposed between the bus and the image type detector 220 according to embodiments.

The image processing circuit 230 may convert the image data output from the image type detector 220 into a format that the transmission interface 250 may process.

The interrupt detector 240 may detect an interrupt INT output from the display driver IC 300 and generate a detection signal. The detection signal may be the same as or different from the interrupt INT, but since the detection signal is a signal related to the interrupt INT, in this specification, the detection signal and the interrupt are equally indicated as 'INT' and collectively referred to as interrupt.

As an example, the transmission interface 250 may function as an interface capable of supporting the video stream interface. The transmission interface 250 may convert the image data output from the image processing circuit 230 into a video stream DPAC and adjust transmission timing of the video stream DPAC based on the interrupt INT.

At this time, the video stream DPAC may include synchronization signals and data. The synchronization signals may refer to signals related to a vertical synchronization signal, a horizontal synchronization signal and a data enable signal to be restored in the display driver IC 300.

Accordingly, the interrupt INT may function as a control signal capable of controlling transmission timing of a video stream DPAC to be transmitted to the display driver IC 300.

As an example, when the data processing system 100 supports the MIPI, the interrupt INT may be a tearing effect signal capable of preventing a tearing effect (TE).

As another example, when the data processing system 100 supports an embedded displayport (eDP), the interrupt INT may refer to a control signal output from the display driver IC 300 and capable of controlling the transmission timing of the video stream DPAC.

The transmission interface 250 may support the MIPI, the eDP, or a high-speed serial interface.

The memory controller 260 may interface image data exchanged between the host 200 and the external memory 262. For example, under the control of the memory controller 260, image data output from the host 200 may be stored in the external memory 262, and image data output from the external memory 262 may be transmitted to the bus 201.

The external memory 262 may be dynamic random access memory (DRAM), solid state drive (SSD), multimedia card (MMC), embedded multimedia card (eMMC), universal serial bus flash drive, or universal flash storage (UFS).

The external memory 262 illustrated in FIG. 1A may mean a set of different types of memories. Accordingly, the external memory 262 may collectively mean the dynamic random access memory and the embedded multimedia card. As an example, an operating system may be loaded from the embedded multimedia card into the dynamic random access memory and executed. When the external memory 262 means the set of memories, the memory controller 260 may also mean a set of memory controllers capable of controlling the different types of memories.

The camera interface 270 may transmit image data output from the camera 272 to the bus 201. For example, the camera 272 may be implemented as a complementary metal-oxide semiconductor image sensor.

The host 200 may further include one or more wireless interfaces capable of wirelessly communicating with other devices. Accordingly, the host 200 may receive the image data wirelessly through wireless interface(s), for example, wireless fidelity, wireless Internet, or long term evolution (LTE).

Also, the data processing system 100 may support camera 2.0.

As described above, whenever the host 200 configured to support the video stream interface needs to transmit the video stream DPAC to the display driver IC 300, it may transmit the video stream DPAC to the display driver IC 300 through the video stream interface according to the interrupt INT output from the display driver IC 300.

The host 200 and the display driver IC 300 may be connected to each other through a first transmission line (or lane) transmitting the video stream DPAC and a second transmission line (or lane) transmitting a clock CLKm. For example, the video stream DPAC may be transmitted in synchronization with the clock CLKm. Each of the video stream DPAC and the clock CLKm may mean differential signals.

The display driver IC 300 includes a receiving interface 310, a data controller 320, a timing controller 340 and an oscillator 350.

The receiving interface 310 may receive the video stream DPAC and the clock CLKm output from the host 200. As an example, the receiving interface 310 may restore data DATA by using the clock CLKm, and the clock CLKm may be bypassed to the data controller 320. That is, the data DATA and the clock CLKm are transmitted to the data controller 320. In the present disclosure, the vertical synchronization signal Vsync and the horizontal synchronization signal Hsync may not be used to process the data DATA. As another example, the receiving interface 310 restores the vertical synchronization signal Vsync, the horizontal synchronization signal Hsync, the data enable signal DE and the data DATA from the video stream DPAC by using the clock CLKm, and the clock CLKm may be bypassed to the data controller 320, but it is not limited thereto. In this case, the data enable signal DE is an indication signal indicating valid data, the data is valid when the data enable signal DE is activated, and the data is invalid when the data enable signal is deactivated.

Meanwhile, the data controller 320 generates a data enable signal DE' by using a clock CLK, and transmits the data enable signal DE' and the data DATA to the timing controller 340. The data enable signal DE' may function as an indication signal indicating an effective period of the data DATA.

The oscillator 350 generates an internal clock fosc. The timing controller 340 may generate control signals (e.g., CLK, iVsync, and iHsync) generated based on the internal clock fosc.

The timing controller 340 includes an interrupt controller 341, a control signal generator 343 and an image processing module 345.

The interrupt controller 341 generates the interrupt INT periodically based on the internal clock fosc. For example, a frequency of the interrupt INT may be 60 Bps. When an data processing system 100 supports the MIPI, the interrupt controller 341 may function as a tearing effect signal generator that generates the tearing effect signal as the interrupt INT.

As an example, the control signal generator 343 may generate the clock CLK based on the internal clock fosc. The clock CLK may be generated by using the internal clock fosc, and a frequency of the clock CLK and a frequency of the internal clock fosc may be the same or different from each other.

As another example, the control signal generator 343 may further generate an internal vertical synchronization signal iVsync and an internal horizontal synchronization signal iHsync based on the internal clock fosc. The internal vertical synchronization signal iVsync may be a vertical synchronization signal related to display of the display data DDATA, and the internal horizontal synchronization signal iHsync may be a horizontal synchronization signal related to display of the display data DDATA.

The image processing module 345 may receive the clock CLK, the data enable signal DE' and the data DATA, process read data DATA by using the clock CLK and the data enable signal DE', and generate the data enable signal DDE and the display data DDATA as a result of processing.

The data enable signal DDE may function as an indication signal indicating an effective period of the display data DDATA.

For example, the image processing module 345 may perform an image enhancement function and/or an image editing function. For example, the image processing module 345 may adjust brightness, contrast, saturation, or sharpness of the data DATA and generate the display data DDATA corresponding to a result of the adjustment.

A line buffer 360 or a shift register may receive the data enable signal DDE and the display data DDATA, and transmit a signal corresponding thereto to the display panel 400.

For example, the line buffer 360 may write analog signals corresponding to the display data DDATA, scan the written signals, and transmit them to data lines arranged in the display panel 400.

Specifically, the line buffer 360 may write the data DDATA in response to the data enable signal DDE that is periodically activated with the clock CLK. More specifically, the line buffer 360 may write the data DDATA when the data enable signal DDE is activated or turned on.

As an example, the line buffer 360 may perform a scan operation in response to the internal vertical synchronization signal iVsync and the internal horizontal synchronization signal iHsync. The scan operation refers to an operation in which the line buffer 360 reads the data DATA and transmits the read data DATA to the display panel 400.

The line buffer 360 may write the data DDATA. Specifically, the line buffer 360 may write the data DATA whenever the data enable signal DDE is activated.

The display panel 400 may be a memory-inside-pixel panel. That is, each of pixels included in the display panel 400 may include a memory therein.

At this time, the line buffer 360 may scan the stored data DATA and transmit it to the display panel 400 in response to the internal horizontal synchronization signal iHsync. Specifically, whenever the internal horizontal synchronization signal iHsync is deactivated, the line buffer 360 reads and scans the written data and transmits it to the display panel 400, and the display panel 400 may write the data into the memory within the pixel.

The display panel 400 may read and display the data DATA stored in the memory within the pixel in response to the internal horizontal synchronization signal iHsync. Specifically, the display panel 400 may display the written data whenever the internal horizontal synchronization signal iHsync is activated.

The display panel 400 may display an image by using an m-bit digital image signal capable of displaying 1 to 2 m gray scales. The display panel 400 may include a plurality of pixels (PXs) arranged in a predetermined pattern, for example, various patterns such as a matrix type or a zigzag type. The pixel PX emits one color, and may emit one color among red, blue, green and white, for example. The pixel PX may emit colors other than red, blue, green and white.

The pixel PX may include a light emitting device. The light emitting device may be a self-light emitting device. For example, the light emitting device may be a light emitting diode (LED). The light emitting device may be a micro to nano size light emitting diode (LED). A light emitting device may emit light of a single peak wavelength or a plurality of peak wavelengths.

The pixel PX may further include a pixel circuit connected to the light emitting device. The pixel circuit may include at least one thin film transistor and at least one capacitor. The pixel circuit may be implemented by a semiconductor stack structure on a substrate.

The pixel PX may operate in frame units. One frame may consist of a plurality of subframes. Each subframe may include a data write period and a light emission period. During the data write period, digital data of a predetermined bit may be stored in the memory included in the pixel PX. The digital data of the predetermined bit stored in the light emission period is read in synchronism with the clock signal, and the digital data is converted into a pulse width modulation signal so that the pixel PX may express a gradation. The light emission period of the subframe may be a sum of times allocated to each bit of the digital data.

However, the display panel 400 of the present disclosure is not limited thereto, and may be variously implemented as a thin-film-transistor liquid-crystal display (TFT-LCD), a light emitting diode (LED) display, an organic light emitting diode (OLED) display, an active-matrix organic light emitting diode (AMOLED) display, or a flexible display.

Figure 1B:
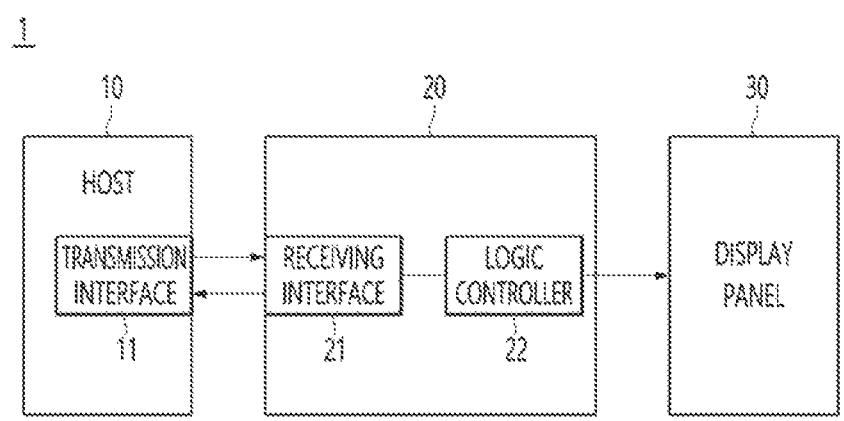
FIG. 1B is a block diagram for explaining another example of a data processing system according to an embodiment.

FIG. 1B is a block diagram for explaining another example of a data processing system according to an embodiment.

A data processing system 1 of FIG. 1B means a system capable of processing display data and command data and displaying them on a display panel 30 based on the processed display data and command data.

A host 10 includes a transmission interface 11. For convenience of explanation, FIG. 1B illustrates that the host 10 includes the transmission interface 11, but is not limited thereto. As an example, the host 10 may include a bus, a central processing unit, an image type detector, an image processing circuit, an interrupt detector, a memory controller and a camera interface which are not illustrated in FIG. 1B.

Meanwhile, the host 10 and the transmission interface 11 which are illustrated in FIG. 1B and the bus, the central processing unit, the image type detector, the image processing circuit, the interrupt detector, the memory controller and the camera interface which are not illustrated in FIG. 1B correspond to the host 200, the bus 201, the central processing unit (CPU) 210, the image type detector 220, the image processing circuit 230, the interrupt detector 240, the transmission interface 250, memory controller 260 and the camera interface 270 which are illustrated in FIG. 1A, overlapping descriptions are omitted.

The host 10 includes the transmission interface 11, and a display driver IC 20 includes a receiving interface 21. The host 10 and the display driver IC 20 are connected through a high-speed data interface. The host 10 transmits data through the transmission interface 11, and the display driver IC 20 receives the data through the receiving interface 21. Data may include the display data and/or the command data.

A MIPI may be used for the high-speed data interface. The MIPI is one of serial interface specifications for connecting a processor and peripheral devices, and is a standard established by the MIPI alliance. For example, a MIPI D-PHY is a high-speed digital serial interface, and a MIPI D-PHY display serial interface (DSI) corresponds to a display protocol standard specification based on D-PHY.

The display driver IC 20 includes the receiving interface 21 and a logic controller 22. For convenience of explanation, FIG. 1B illustrates that the display driver IC 20 includes the receiving interface 21 and the logic controller 22, but is not limited thereto. As an example, the display driver IC 20 may include a data controller, a timing controller and an oscillator which are not illustrated in FIG. 1B.

Meanwhile, the display driver IC 20 and the receiving interface 21 which are illustrated in FIG. 1B and the data controller, the timing controller and the oscillator which are not illustrated in FIG. 1B correspond to the display driver IC 300, the receiving interface 310, the data controller 320, the timing controller 340 and the oscillator 350 which are illustrated in FIG. 1A, overlapping descriptions are omitted.

The logic controller 22 outputs a control signal corresponding to the display data and outputs a signal that causes one or more sub-pixels in the display panel connected to the logic controller to be driven in response to the control signal.

Meanwhile, the logic controller 22 may include the data controller, the timing controller and the oscillator, and operations of the data controller, the timing controller and the oscillator to be described below may be implemented by a single device (e.g., the logic controller 22).

Figure 2:
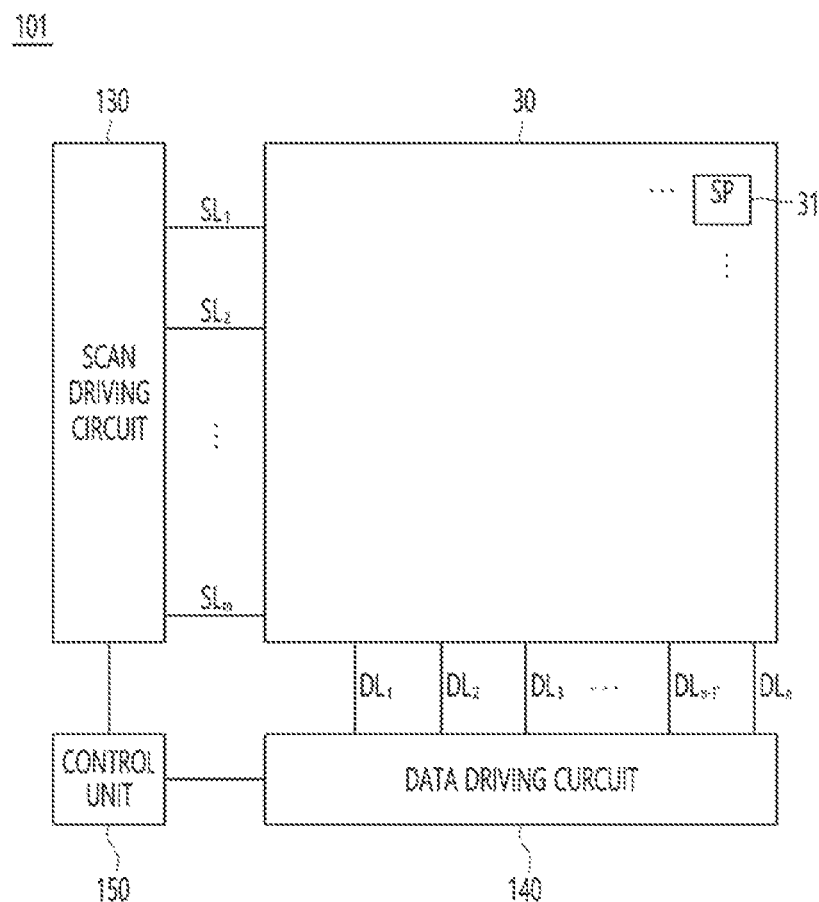
FIG. 2 is a block diagram for explaining an example of a display driving apparatus according to an embodiment.

FIG. 2 is a block diagram for explaining another example of a display driving apparatus according to an embodiment.

Referring to FIG. 2, a display apparatus 101 according to an embodiment may include a display panel 30, a scan driving circuit 130, a data driving circuit 140 and a control unit 150. The display panel 30 is the same configuration as the display panel 30 of FIG. 1B, overlapping descriptions will be omitted below. Meanwhile, the logic controller 22 of FIG. 1B may include the driving circuit 130, the data driving circuit 140 and the control unit 150, and operations of the driving circuit 130, the data driving circuit 140 and the control unit 150 to be described below may be implemented by a single device (e.g., the logic controller 22).

The display panel 30 may include a plurality of pixels. The plurality of pixels may be arranged in an m×n matrix form (m and n are natural numbers). However, patterns in which the plurality of pixels are arranged may be arranged in various patterns according to embodiments such as a zigzag type.

Each pixel may contain one or more light emitting devices. The light emitting device may be a light emitting diode (LED). The light emitting diode may be a micro light emitting diode having a size of 80 um or less. One pixel may output various colors through a plurality of light emitting devices having different colors. As an example, one pixel may include light emitting devices composed of red, green and blue colors. As another example, when a white light emitting device may be further included, the white light emitting device may replace any one of red, green and blue light emitting devices. In the embodiment in which one pixel includes the plurality of light emitting devices, each light emitting device included in one pixel may be referred to as a sub-pixel SP. As an example, the sub-pixel may include an R sub-pixel, a G sub-pixel and a B sub-pixel.

Each sub-pixel SP and 31 may store data related to brightness, that is, gradation of a color to be output during one image frame.

Each pixel may include a pixel driving circuit that drives the light emitting device included in the pixel, that is, the sub-pixel SP. The pixel driving circuit may drive turn on or turn off operation of the sub-pixel by signals output from the driving circuit 130 and/or the data driving circuit 140. As an example, the pixel driving circuit may include at least one transistor and at least one capacitor. The pixel driving circuit may be implemented on a semiconductor wafer and connected to the light emitting device by forming a stacked structure, or may be arranged and connected to a side surface of the light emitting device to control light emission of the light emitting device.

The display panel 30 may be implemented as one of liquid-crystal display (LCD), light emitting diode (LED) display, micro light emitting diode display, organic light emitting diode (OLED) display, active-matrix organic light emitting diode (AMOLED) display, electrochromic display (ECD), digital mirror device (DMD), actuated mirror device (AMD), grating light valve (GLV), plasma display panel (PDP), electro luminescent display (ELD) and vacuum fluorescent display (VFD), and other types of flat panel displays or flexible displays.

Meanwhile, a display panel 111 may include one or more scan lines SL1 to SLm arranged in a first direction and one or more data lines DL1 to DLn arranged in a second direction. Here, the first direction means a row direction or column direction, and the second direction means a column direction or row direction. As an example, the first direction may be the row direction and the second direction may be the column direction. As another example, the first direction may be the column direction and the second direction may be the row direction.

Meanwhile, the sub-pixel SP may be located at an intersection of the one or more scan lines SL1 to SLm and the one or more data lines DL1 to DLn. Each sub-pixel SP may be connected to one scan line SLk and one data line DLk. The one or more scan lines SL1 to SLm may be connected to the driving circuit 130, and the one or more data lines DL1 to DLn may be connected to the data driving circuit 140.

The driving circuit 130 may output a signal (hereinafter, first signal) for driving one or more sub-pixels SPs connected to any one of the one or more scan lines SL1 to SLm. Preferably, the driving circuit 130 may sequentially select the one or more scan lines SL1 to SLm. As an example, a sub-pixel SP connected to a first scan line SL1 may be driven during a first scan driving period, and a sub-pixel SP connected to a second scan line SL2 may be driven during a second scan driving period.

The data driving circuit 140 may output a signal related to gradation (hereinafter, second signal) to each the sub-pixel SP through the one or more data lines DL1 to DLn. As an example, as illustrated in FIG. 2, one data line is connected to one or more sub-pixels SPs in a vertical direction, but signals related to gradation may be input only to sub-pixels SPs connected to a scan line selected by the driving circuit 130.

The control unit 150 may output a control signal to execute operations of the driving circuit 130 and the data driving circuit 140. The control unit 150 may output a control signal corresponding to display data corresponding to one image frame to the driving circuit 130 or the data driving circuit 140. The control unit 150 may determine a pulse width modulation on duty representing an emission time period of the light emitting diode during one frame period. Meanwhile, the driving circuit 130 and the data driving circuit 140 may include a processor, an application-specific IC (ASIC), other chipsets, a logic circuit, a register, a communication modem, a data processing unit, and the like known in the art to which the present disclosure belongs to execute various control logics. Also, when the control logic is implemented as software, the driving circuit 130 and the data driving circuit 140 may be implemented as a set of program modules. At this time, the program module may be stored in a memory device and executed by a processor.

In order for a computer to read the program and execute methods implemented in the program, the program may include code coded in a computer language such as C/C++, C #, JAVA, Python, machine language that may be read by a processor (central processing unit) of the computer through a device interface of the computer. Such code may include functional code related to functions, etc. defining necessary functions for executing methods, and control code related to execution procedure required for the computer's processor to execute the functions according to a predetermined procedure. In addition, such code may further include code related to additional information required for the computer's processor to execute functions or memory reference for where the media should be referenced from the computer's internal or external memory (address). In addition, when the computer's processor needs to communicate with any other remote computer or server in order to execute functions, the code may further include code related to communication for how to communicate with other remote computer or server, and what information or media should be transmitted and received during communication.

A storage medium in which the program is stored means a medium that stores data semi-permanently and may be read by a device, not a medium that stores data for a short moment, such as a register or cache memory. Specifically, examples of the storage medium include read only memory, random access memory, compact disc read only memory, magnetic tape, floppy disk, optical data storage device, etc., but are not limited thereto. That is, the program may be stored in various recording media on various servers accessible by the computer or various recording media on the user's computer. In addition, the storage medium may be distributed in a networked computer system to store computer readable code in a distributed manner.

Figure 3:
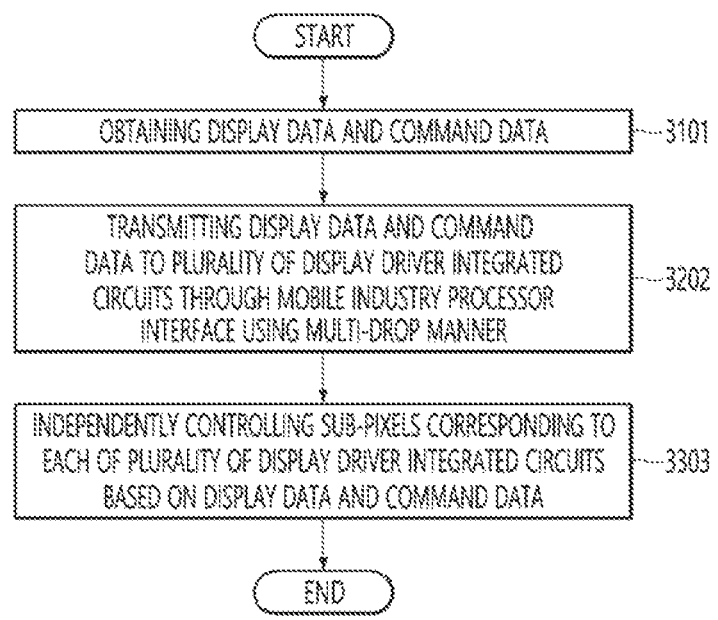
FIG. 3 is a flowchart for explaining an example of a data transmission method of a display driving apparatus according to an embodiment.

FIG. 3 is a flowchart for explaining an example of a data transmission method of a display driving apparatus according to an embodiment.

Referring to FIG. 3, a display driving apparatus according to an embodiment may transmit data by obtaining display data and command data, transmitting the display data and the command data to each of a plurality of display driver ICs through a MIPI using a point-to-multipoint (multi-drop) manner, and independently controlling sub-pixels corresponding to each of the plurality of display driver ICs based on the display data and the command data.

In operation 3101, the display data and the command data are obtained. As an example, a host may obtain the display data and the command data. As another example, the host may obtain the display data and the command data by generating them. As another example, the host may obtain the display data and the command data by receiving them from an external device (not illustrated), but it is not limited thereto.

In operation 3202, the display data and the command data are transmitted to each of the plurality of display driver ICs through the MIPI using the point-to-multipoint (multi-drop) manner. As an example, the host may transmit the display data and the command data to each of the plurality of display driver ICs through a single line by using each of MIPI.

Figure 4:
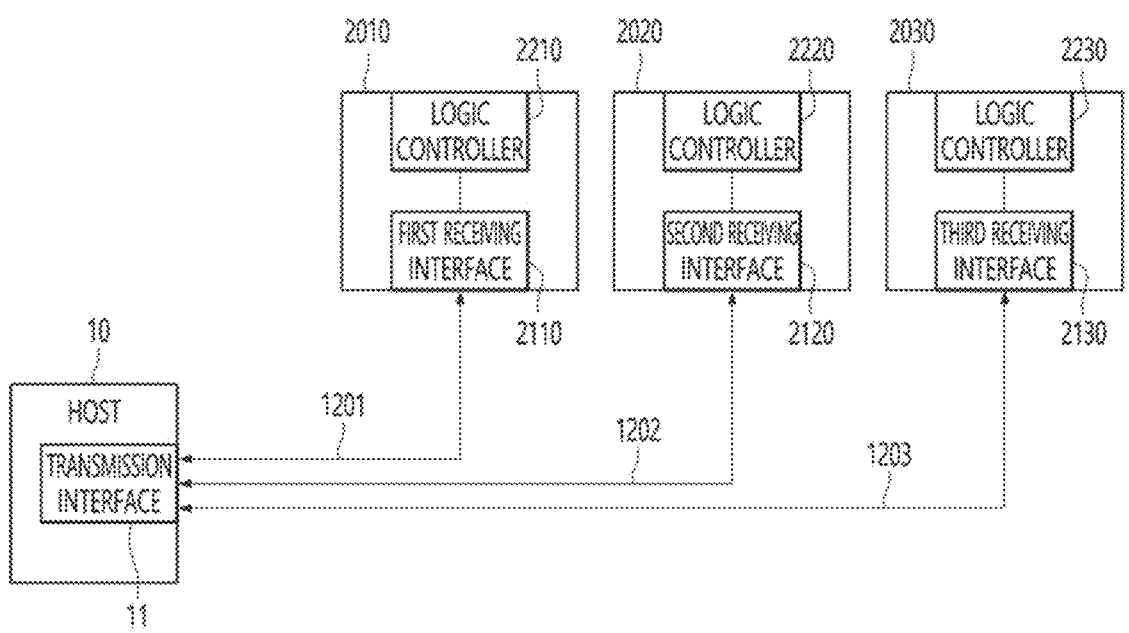
FIG. 4 is a block diagram for explaining an example of a data transmission method of a conventional display driving apparatus.
Figure 5A:
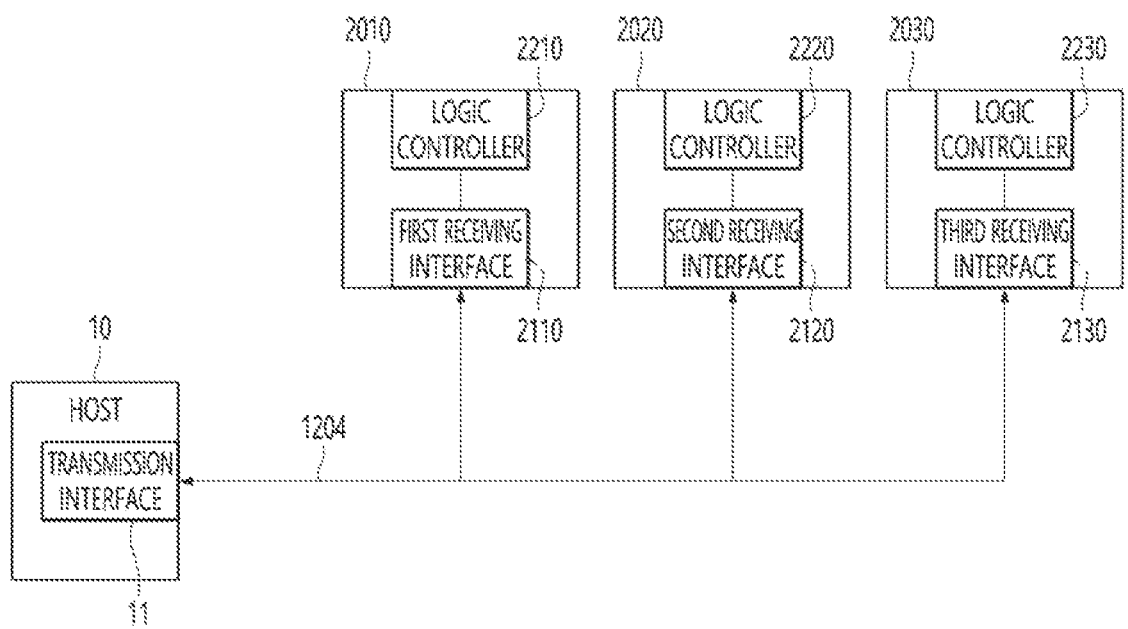
FIG. 5A is a block diagram for explaining an example of a data transmission method of a display driving apparatus according to an embodiment.
Figure 5B:
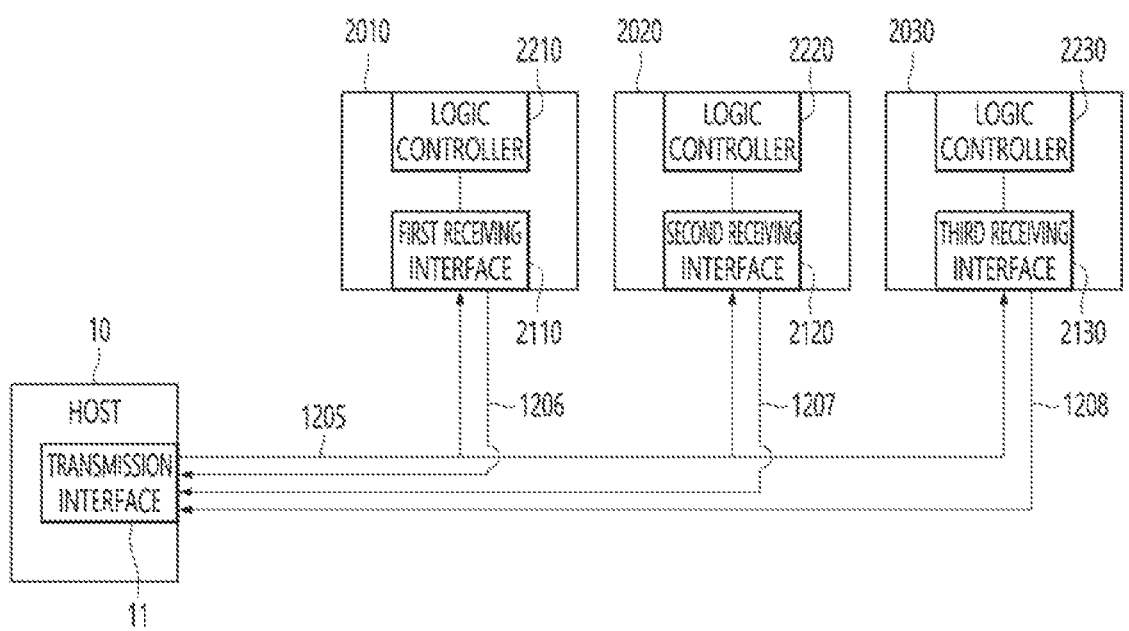
FIG. 5B is a block diagram for explaining another example of a data transmission method of a display driving apparatus according to an embodiment.

Referring to FIG. 4, FIG. 5A and FIG. 5B, a data transmission method of a display driving apparatus will be described.

FIG. 4 is a block diagram for explaining an example of a data transmission method of a conventional display driving apparatus.

Referring to FIG. 4, data is transmitted from a transmission interface 11 in a host 10 to each of a first display driver IC 2010, a second display driver IC 2020 and a third display driver IC through a plurality of lines. And, based on a response request of the host 10, each of a first receiving interface 2110 of the first display driver IC 2010, a second receiving interface 2120 of the second display driver IC 2020 and a third receiving interface 2130 of the third display driver IC responds by transmitting response data to the host 10.

The response data may include command data transmitted by the host, but it is not limited thereto.

In the conventional display driving apparatus, data is transmitted to each of the plurality of display driver ICs through the plurality of lines by using a serial peripheral interface (SPI) or a quad-SPI (QSPI). The first display driver IC 2010 corresponds to an R sub-pixel, the second display driver IC 2020 corresponds to a G sub-pixel, and the third display driver IC corresponds to a B sub-pixel. The R sub-pixel, the G sub-pixel and the B sub-pixel are included in sub-pixel. Specifically, data corresponding to the R sub-pixel is transmitted from the transmission interface 11 in the host 10 to the first receiving interface 2110 in the first display driver IC 2010 through a first line 1201, and data corresponding to the G sub-pixel is transmitted from the transmission interface 11 in the host 10 to the second receiving interface 2120 in the second display driver IC 2020 through a second line 1202, and data corresponding to the B sub-pixel is transmitted from the transmission interface 11 in the host 10 to the third receiving interface 2130 in the third display driver IC through a third line 1203. The host 10 transmits data corresponding to the R sub-pixel to the first display driver IC 2010 corresponding to the R sub-pixel, transmits data corresponding to the G sub-pixel to the second display driver IC 2020 corresponding to the G sub-pixel, and transmits data corresponding to the B sub-pixel to the third display driver IC corresponding to the B sub-pixel. However, the data transmission speed of the conventional display driving apparatus using the SPI or the quad SPI is up to several tens of Mbps.

FIG. 5A is a block diagram for explaining an example of a data transmission method of a display driving apparatus according to an embodiment.

Referring to FIG. 5A, data is transmitted from a transmission interface 11 in a host 10 to each of a first display driver IC 2010, a second display driver IC 2020 and a third display driver IC 2030 through a single line. And, based on a response request of the host 10, each of a first receiving interface 2110 of the first display driver IC 2010, a second receiving interface 2120 of the second display driver IC 2020 and a third receiving interface 2130 of the third display driver IC 2030 responds by transmitting response data to the host 10 in a bus turn around (BTA) manner by using a MIPI.

In the display driving apparatus according to an embodiment, data is transmitted to each of the plurality of display driver ICs using the point-to-multipoint (multi-drop) manner through the single line by using the MIPI. Specifically, integrated data is transmitted from the transmission interface 11 in the host 10 to the first receiving interface 2110 in the first display driver IC 2010 through a single line 1204, the integrated data is transmitted from the transmission interface 11 in the host 10 to the second receiving interface 2120 in the second display driver IC 2020 through the single line 1204, and the integrated data is transmitted from the transmission interface 11 in the host 10 to the third receiving interface 2130 in the third display driver IC 2030 through the single line 1204. The host 10 transmits integrated data corresponding to a R sub-pixel, a G sub-pixel and a B sub-pixel to the first display driver IC 2010, the second display driver IC 2020 and the third display driver IC 2030 through the single line 1204. Furthermore, based on the response request of the host 10, each of the first receiving interface 2110 of the first display driver IC 2010, the second receiving interface 2120 of the second display driver IC 2020 and the third receiving interface 2130 of the third display driver IC 2030 responds by transmitting the response data to the host 10 through the single line in the BTA manner by using the MIPI. At this time, since the response data is transmitted to the host 10 through the single line, in order to prevent the response data from being contacted, when the first receiving interface 2110 transmits the response data, the second receiving interface 2120 and the third receiving interface 2130 do not transmit the response data. Also, when the second receiving interface 2120 transmits response data, the first receiving interface 2110 and the third receiving interface 2130 do not transmit the response data. Also, when the third receiving interface 2130 transmits response data, the first receiving interface 2110 and the second receiving interface 2120 do not transmit the response data.

According to the present disclosure according to an embodiment, data transmission speed of up to several GBps may be implemented by transmitting data through the single line by using the MIPI using the point-to-multipoint (multi-drop) manner.

FIG. 5B is a block diagram for explaining an example of a data transmission method of a display driving apparatus according to an embodiment.

Referring to FIG. 5B, data is transmitted from a transmission interface 11 in a host 10 to each of a first display driver IC 2010, a second display driver IC 2020 and a third display driver IC 2030 through a single line. And, based on the response request of the host 10, each of a first receiving interface 2110 of the first display driver IC 2010, a second receiving interface 2120 of the second display driver IC 2020 and a third receiving interface 2130 of the third display driver IC 2030 responds by transmitting response data to the host 10 in a point-to-point manner by using a SPI. In the display driving apparatus according to an embodiment of FIG. 5B, each of the first receiving interface 2110, the second receiving interface 2120 and the third receiving interface 2130 transmits the response data to the host in the point-to-point manner through a plurality of lines by using the SPI, so that it is possible to transmit the response data at the same time.

Referring back to FIG. 3, in operation 3303, the sub-pixels corresponding to each of the plurality of display driver ICs are independently controlled based on the display data and the command data. Specifically, a receiving interface included in each of the plurality of display driver ICs receives the display data and the command data, and a logic controller included in each of the plurality of display driver ICs selectively writes the display data and the command data, so that the sub-pixels are controlled.

Meanwhile, in the prior art, data is transmitted from the host to each of the plurality of display driver ICs in the point-to-point manner by using the plurality of lines, but in the case of transmitting data in the point-to-multipoint (multi-drop) manner by using the single line according to an embodiment of the present disclosure, in order for the plurality of display driver ICs to selectively write data, it may be configured to first receive a selection data and write the command data, or may be configured such that the configuration of the command data corresponds to each of the plurality of display driver ICs. Specific details will be described below.

First, the receiving interface included in each of the plurality of display driver ICs receives the display data and the command data. As described above, the receiving interface included in each of the plurality of display driver ICs receives the display data and the command data through the single line by using the MIPI using the point-to-multipoint (multi-drop) manner.

Meanwhile, the receiving interface included in each of the plurality of display driver ICs may receive the selection data for selectively writing the display data and the command data. Unlike the conventional display driving apparatus, since the display driving apparatus according to an embodiment transmits and receives the display data and the command data through the single line, the same data is transmitted to each of the plurality of display driver ICs. In the present disclosure according to an embodiment, the logic controller included in each of the plurality of display driver ICs selectively writes the same data transmitted to each of the plurality of display driver ICs, so that the sub-pixel may be controlled.

As an example, the receiving interface receives the selection data for selectively writing the display data and the command data, and based on the selection data, the logic controller may control the sub-pixel by selectively writing the display data and the command data. As an example, the selection data may be password data that causes the logic controller corresponding to the R sub-pixel to write the received command data. The logic controller in the display driver IC corresponding to the R sub-pixel may control the R sub-pixel by selectively writing the command data by receiving the password data corresponding to the R sub-pixel. Here, the command data is data that may be written by all of the display driver IC corresponding to the R sub-pixel, the display driver IC corresponding to the G sub-pixel and the display driver IC corresponding to the B sub-pixel. By receiving the password data causing the display driver IC corresponding to the R sub-pixel to write, only the display driver IC corresponding to the R sub-pixel writes the command data, so that the R sub-pixel may be controlled.

As another example, command data may include common command data commonly applied to the R sub-pixel, the G sub-pixel and the B sub-pixel included in the sub-pixel, a first command data applied only to the R sub-pixel, a second command data applied only to the G sub-pixel and a third command data applied only to the B sub-pixel. Even when the plurality of display driver ICs receive the same command data, the logic controller may control the sub-pixels by selectively writing in response to the first command data to the third command data. The first command data may be written only by the display driver IC corresponding to the R sub-pixel, the second command data may be written only by the display driver IC corresponding to the G sub-pixel, and the third command data may be written only by the display driver IC corresponding to the B sub-pixel.

Meanwhile, based on the host's response request, the receiving interface may respond by transmitting the response data to the host.

As an example, based on the host's response request, the receiving interface may respond by transmitting the response data in the BTA manner through the single line by using the MIPI. Specifically, the receiving interface may respond by transmitting the response data to the host through the single line by using the same MIPI used by the host to transmit the display data and the command data.

As another example, based on the host's response request, the receiving interface may respond by transmitting the response data in the point-to-point manner through the plurality of lines by using the SPI. Specifically, the receiving interface may respond by transmitting the response data to the host through the plurality of lines by using the SPI instead of using the MIPI used by the host to transmit the display data and the command data.

As another example, when the receiving interfaces included in each of the plurality of display driver ICs receives the selection data for selectively writing the display data and the command data, each of the receiving interfaces may respond by transmitting the response data to the host in the BTA manner through the single line by using the same MIPI used by the host to transmit the display data and the command data based on the host's response request.

As another example, when the receiving interface included in each of the plurality of display driver ICs receives the selection data for selectively writing the display data and the command data, each of the receiving interfaces may respond by transmitting the response data to the host through the plurality of lines by using the SPI based on the host's response request.

As another example, when the receiving interface included in each of the plurality of display driver ICs receives the command data including the common command data commonly applied to the R sub-pixel, the G sub-pixel and the B sub-pixel included in the sub-pixel, the first command data applied only to the R sub-pixel, the second command data applied only to the G sub-pixel and the third command data applied only to the B sub-pixel, each of the receiving interfaces may respond by transmitting the response data to the host through the plurality of lines by using the SPI based on the host's response request.

Referring to FIG. 6 to FIG. 9, an example of a TX mode and a RX mode of a display driving apparatus according to an embodiment will be described.

Figure 6:
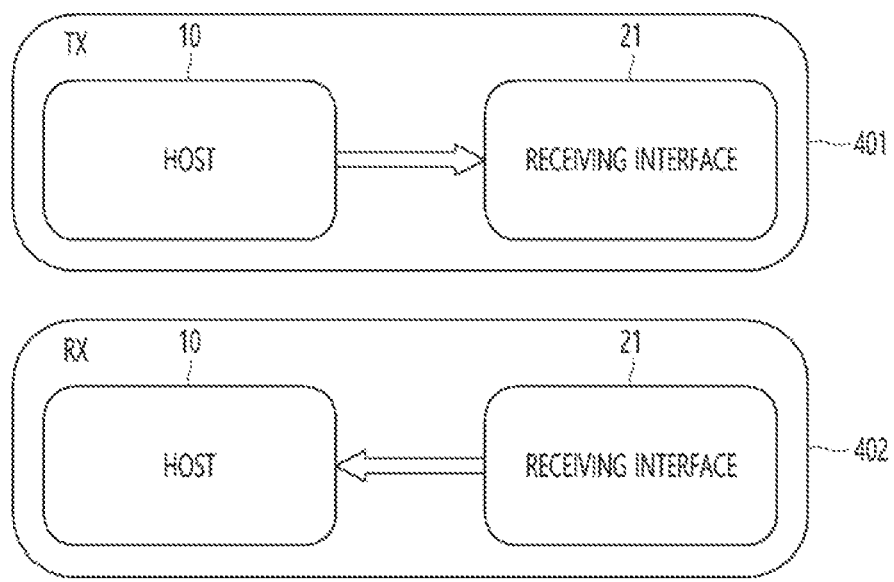
FIG. 6 is a block diagram for explaining an example of a TX mode and a RX mode of a display driving apparatus according to an embodiment.

FIG. 6 is a block diagram for explaining an example of a TX mode and a RX mode of a display driving apparatus according to an embodiment.

A TX mode 401 means that display data and command data transmitted from a host 10 are transmitted to a receiving interface 21 included in each of a plurality of display driver ICs. A RX mode 402 means that the receiving interface 21 responds by transmitting a response data to the host 10 based on a response request of the host 10. The response data may include the command data received by the receiving interface 21.

Figure 7:
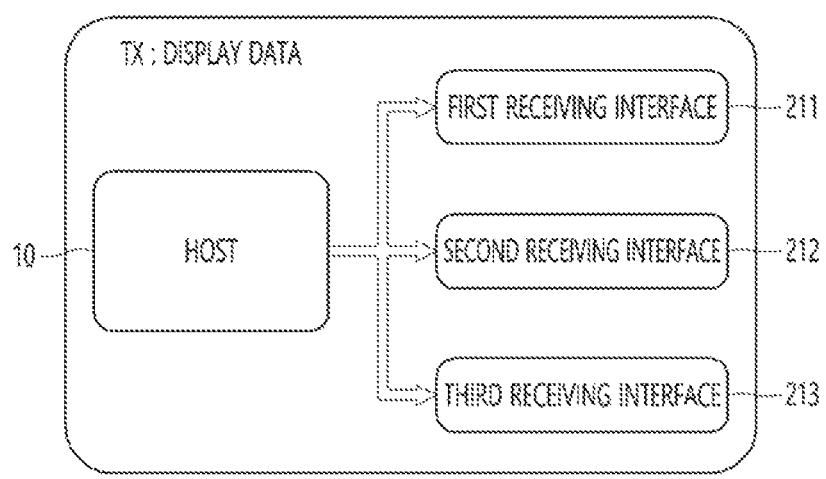
FIG. 7 is a block diagram for explaining an example of a TX mode of a display driving apparatus according to an embodiment.

FIG. 7 is a block diagram for explaining an example of a TX mode of a display driving apparatus according to an embodiment.

Referring to FIG. 7, a host 10 transmits display data and command data to a receiving interface 21 through a single line by using a MIPI using a point-to-multipoint (multi-drop) manner. A logic controller included in each of a plurality of display driver ICs selectively writes the display data and the command data received by the receiving interface to control a sub-pixel. Hereinafter, a case in which the logic controller included in each of the plurality of display driver IC s selectively writes the display data and the command data received by the receiving interface will be described.

Figure 8:
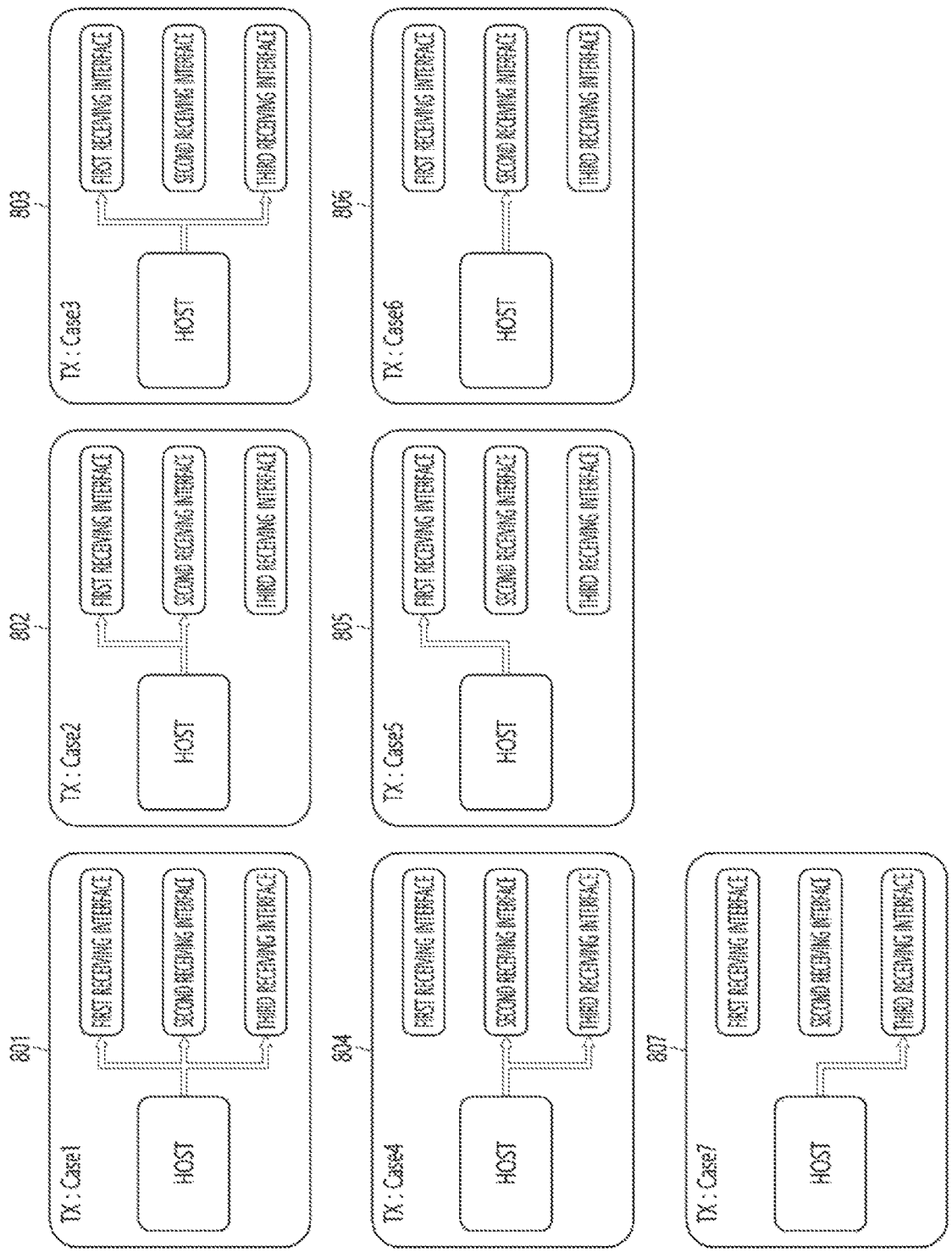
FIG. 8 is a block diagram for explaining another example of a TX mode of a display driving apparatus according to an embodiment.

FIG. 8 is a block diagram for explaining another example of a TX mode of a display driving apparatus according to an embodiment.

Referring to FIG. 8, case 1 801 to case 7 807 of a TX mode may be confirmed.

In case 1 801, a first logic controller corresponding to a first receiving interface, a second logic controller corresponding to a second receiving interface and a third logic controller corresponding to a third receiving interface independently control sub-pixels corresponding to each of a plurality of display driver ICs by writing display data and command data.

As an example, the first logic controller, the second logic controller and the third logic controller may independently control the sub-pixels corresponding to each of the plurality of display driver ICs by selectively writing the display data and the command data based on selection data. The selection data may be configured as {(Display Command 91 h Send: Red Chip Select Enable), (Display Command 92 h Send: Green Chip Select Enable), (Display Command 93 h Send: Blue Chip Select Enable)}. Based on the selection data, a logic controller corresponding to a R sub-pixel, a logic controller corresponding to a G sub-pixel, and a logic controller corresponding to a B sub-pixel may be all turned on to write the display data and the command data.

As another example, the first logic controller, the second logic controller and the third logic controller may independently control the sub-pixels corresponding to each of the plurality of display driver ICs by selectively writing commands including common command data commonly applied to R sub-pixel, G sub-pixel and B sub-pixel which are included in the sub-pixels, first command data applied only to the R sub-pixel, second command data applied only to the G sub-pixel and third command data applied only to the B sub-pixel. The common command data may control R, G and B sub-pixels by writing all of the first logic controller, the second logic controller and the third logic controller. The first command data may control only the R sub-pixel by writing only the first logic controller corresponding to the R sub-pixel. The second command data may control only the G sub-pixel by writing only the second logic controller corresponding to the G sub-pixel. The third command data may control only the B sub-pixel by writing only the third logic controller corresponding to the B sub-pixel.

In case 2 802, a first logic controller and a second logic controller independently control sub-pixels corresponding to each of a plurality of display driver ICs by writing display data and command data.

As an example, the first logic controller and the second logic controller may independently control the sub-pixels corresponding to each of the plurality of display driver ICs by selectively writing the display data and the command data based on selection data. The selection data may be configured as {(Display Command 91 h Send: Red Chip Select Enable), (Display Command 92 h Send: Green Chip Select Enable), (Display Command 96 h Send: Blue Chip Select Disable)}. Based on the selection data, a logic controller corresponding to a R sub-pixel and a logic controller corresponding to a G sub-pixel are turned on, and a logic controller corresponding to a B sub-pixel is turned off. The display data and the command data are written by the logic controller corresponding to the R sub-pixel and the logic controller corresponding to the G sub-pixel, so that the R sub-pixel and the G sub-pixel are controlled. Since the logic controller corresponding to the B sub-pixel is off and may not write the display data and the command data, the B sub-pixel is not controlled by the display data and the command data.

As another example, the first logic controller and the second logic controller may independently control the sub-pixels corresponding to each of the plurality of display driver ICs by selectively writing a command including first command data applied only to the R sub-pixel and second command data applied only to the G sub-pixel. The first command data may control only the R sub-pixel by writing only the first logic controller corresponding to the R sub-pixel. The second command data may control only the G sub-pixel by writing only the second logic controller corresponding to the G sub-pixel.

In case 3 803, a first logic controller and a third logic controller independently control sub-pixels corresponding to each of a plurality of display driver ICs by writing display data and command data.

As an example, the first logic controller and the third logic controller may independently control the sub-pixels corresponding to each of the plurality of display driver ICs by selectively writing the display data and the command data based on selection data. The selection data may be configured as {(Display Command 91 h Send: Red Chip Select Enable), (Display Command 93 h Send: Blue Chip Select Enable), (Display Command 95 h Send: Green Chip Select Disable)}. Based on the selection data, a logic controller corresponding to a R sub-pixel and a logic controller corresponding to a B sub-pixel are turned on, and a logic controller corresponding to a G sub-pixel is turned off. The display data and the command data are written by the logic controller corresponding to the R sub-pixel and the logic controller corresponding to the B sub-pixel, so that the R sub-pixel and the B sub-pixel are controlled. Since the logic controller corresponding to the G sub-pixel is off and may not write the display data and the command data, the G sub-pixel is not controlled by the display data and the command data.

As another example, the first logic controller and the third logic controller may independently control the sub-pixels corresponding to each of the plurality of display driver ICs by selectively writing a command including first command data applied only to the R sub-pixel and third command data applied only to the B sub-pixel. The first command data may control only the R sub-pixel by writing only the first logic controller corresponding to the R sub-pixel. The third command data may control only the B sub-pixel by writing only the third logic controller corresponding to the B sub-pixel.

In case 4 804, a second logic controller and a third logic controller independently control sub-pixels corresponding to each of a plurality of display driver ICs by writing data and command data.

As an example, the second logic controller and the third logic controller may independently control the sub-pixels corresponding to each of the plurality of display driver ICs by selectively writing the display data and the command data based on selection data. The selection data may be configured as {(Display Command 92 h Send: Green Chip Select Enable), (Display Command 93 h Send: Blue Chip Select Enable), (Display Command 94 h Send: Red Chip Select Disable)}. Based on the selection data, a logic controller corresponding to a G sub-pixel and a logic controller corresponding to a B sub-pixel are turned on, and a logic controller corresponding to a R sub-pixel is turned off. The display data and the command data are written by the logic controller corresponding to the G sub-pixel and the logic controller corresponding to the B sub-pixel, so that the G sub-pixel and the B sub-pixel are controlled. Since the logic controller corresponding to the R sub-pixel is off and may not write the display data and the command data, the R sub-pixel is not controlled by the display data and the command data.

As another example, the second logic controller and the third logic controller may independently control the sub-pixels corresponding to each of the plurality of display driver ICs by selectively writing a command including second command data applied only to the G sub-pixel and third command data applied only to the B sub-pixel. The second command data may control only the G sub-pixel by writing only the first logic controller corresponding to the G sub-pixel. The third command data may control only the B sub-pixel by writing only the second logic controller corresponding to the B sub-pixel.

In case 5 805, a first logic controller independently controls sub-pixels corresponding to each of a plurality of display driver ICs by writing data and command data.

As an example, the first logic controller may independently control the sub-pixels corresponding to each of the plurality of display driver ICs by selectively writing the display data and the command data based on selection data. The selection data may be configured as {(Display Command 91 h Send: Red Chip Select Enable), (Display Command 95 h Send: Green Chip Select Disable), (Display Command 96 h Send: Blue Chip Select Disable)}. Based on the selection data, a logic controller corresponding to a R sub-pixel is turned on, and a logic controller corresponding to a G sub-pixel and a logic controller corresponding to a B sub-pixel are turned off. The display data and the command data are written by the logic controller corresponding to the R sub-pixel, so that the R sub-pixel is controlled. Since the logic controller corresponding to the G sub-pixel and the logic controller corresponding to the B sub-pixel are off and do not write the display data and the command data, the G sub-pixel and the B sub-pixel are not controlled by the display data and the command data.

As another example, the first logic controller may independently control the sub-pixels corresponding to each of the plurality of display driver ICs by selectively writing a command including first command data applied only to the R sub-pixel. The first command data may control only the R sub-pixel by writing only the first logic controller corresponding to the R sub-pixel.

In case 6 806, a second logic controller independently controls sub-pixels corresponding to each of a plurality of display driver ICs by writing data and command data.

As an example, the second logic controller may independently control the sub-pixels corresponding to each of the plurality of display driver ICs by selectively writing the display data and the command data based on selection data. The selection data may be configured as {(Display Command 92 h Send: Green Chip Select Enable), (Display Command 94 h Send: Red Chip Select Disable), (Display Command 96 h Send: Blue Chip Select Disable)}. Based on the selection data, a logic controller corresponding to a G sub-pixel is turned on, and a logic controller corresponding to a R sub-pixel and a logic controller corresponding to a B sub-pixel are turned off. The display data and the command data are written by the logic controller corresponding to the G sub-pixel, so that the G sub-pixel is controlled. Since the logic controller corresponding to the R sub-pixel and the logic controller corresponding to the B sub-pixel are off and do not write the display data and the command data, the R sub-pixel and the B sub-pixel are not controlled by the display data and the command data.

As another example, the second logic controller may independently control the sub-pixels corresponding to each of the plurality of display driver ICs by selectively writing a command including second command data applied only to the G sub-pixel. The second command data may control only the G sub-pixel by writing only the second logic controller corresponding to the G sub-pixel.

In case 7 807, a third logic controller independently controls sub-pixels corresponding to each of a plurality of display driver ICs by writing data and command data.

As an example, the third logic controller may independently control the sub-pixels corresponding to each of the plurality of display driver ICs by selectively writing the display data and the command data based on selection data. The selection data may be configured as {(Display Command 93 h Send: Blue Chip Select Enable), (Display Command 94 h Send: Red Chip Select Disable), (Display Command 95 h Send: Green Chip Select Disable)}. Based on the selection data, a logic controller corresponding to a B sub-pixel is turned on, and a logic controller corresponding to a R sub-pixel and a logic controller corresponding to a G sub-pixel are turned off. The display data and the command data are written by the logic controller corresponding to the B sub-pixel, so that the B sub-pixel is controlled. Since the logic controller corresponding to the R sub-pixel and the logic controller corresponding to the G sub-pixel are off and do not write the display data and the command data, the R sub-pixel and the G sub-pixel are not controlled by the display data and the command data.

As another example, the third logic controller may independently control the sub-pixels corresponding to each of the plurality of display driver ICs by selectively writing a command including third command data applied only to the B sub-pixel. The third command data may control only the B sub-pixel by writing only the third logic controller corresponding to the B sub-pixel.

Figure 9:
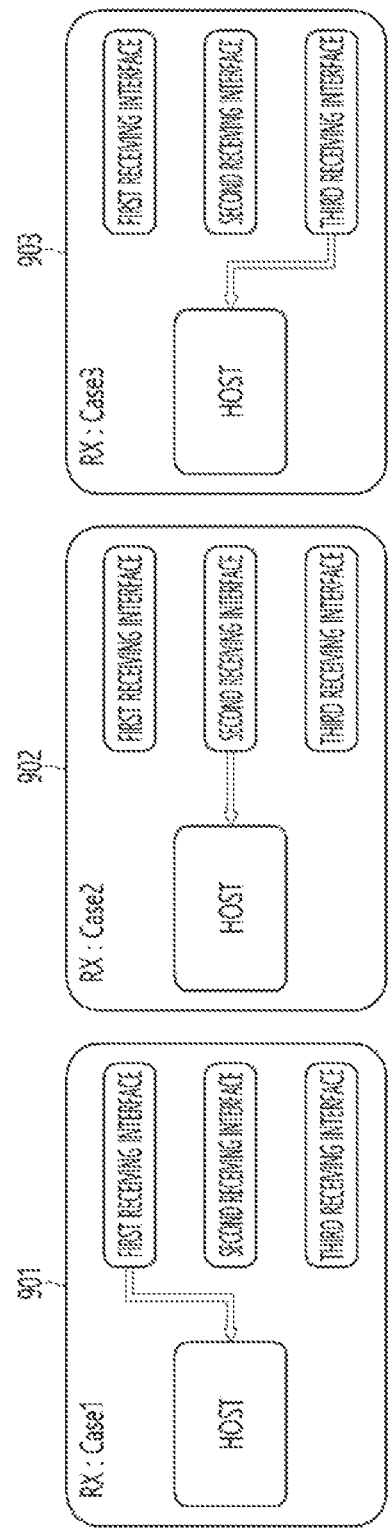
FIG. 9 is a block diagram for explaining an example of a RX mode of a display driving apparatus according to an embodiment.

FIG. 9 is a block diagram for explaining an example of a RX mode of a display driving apparatus according to an embodiment.

Referring to FIG. 9, case 1 901 to case 3 903 of a RX mode may be confirmed.

In case 1 901, a first receiving interface responds by transmitting response data to a host based on a response request of the host. As an example, based on the host's response request, the first receiving interface may respond by transmitting the response data in a BTA manner through a single line by using a MIPI. At this time, a second receiving interface and a third receiving interface do not transmit response data while the first receiving interface responds. The host's response request may be configured as {(Display Command 91 h Send: Red Chip Select Enable), (Display Command 95 h Send:Green Chip Select Disable), (Display Command 96 h Send:Blue Chip Select Disable), (Display Command 97 h and para data 01 h)}. As another example, based on the host's response request, the first receiving interface may respond by transmitting the response data in a point-to-point manner through a plurality of lines by using a SPI. At this time, the second receiving interface and the third receiving interface may respond by transmitting the response data through a line different from the SPI used by the first receiving interface.

In case 2 902, a second receiving interface responds by transmitting response data to a host based on a response request of the host. As an example, based on the host's response request, the second receiving interface may respond by transmitting the response data in a BTA manner through a single line by using a MIPI. At this time, a first receiving interface and a third receiving interface do not transmit response data while the second receiving interface responds. The host's response request may be configured as {(Display Command 92 h Send: Green Chip Select Enable), (Display Command 94 h Send: Red Chip Select Disable), (Display Command 96 h Send: Blue Chip Select Disable), (Display Command 97 h and para data 02 h)}. As another example, based on the host's response request, the second receiving interface may respond by transmitting the response data in a point-to-point manner through a plurality of lines by using a SPI. At this time, the first receiving interface and the third receiving interface may respond by transmitting the response data through a line different from the SPI used by the second receiving interface.

In case 3 903, a third receiving interface responds by transmitting response data to a host based on a response request of the host. As an example, based on the host's response request, the third receiving interface may respond by transmitting the response data in a BTA manner through a single line by using a MIPI. At this time, a first receiving interface and a second receiving interface do not transmit response data while the third receiving interface responds. The host's response request may be configured as {(Display Command 93 h Send: Blue Chip Select Enable), (Display Command 94 h Send: Red Chip Select Disable), (Display Command 95 h Send: Green Chip Select Disable), (Display Command 97 h and para data 03 h)}. As another example, based on the host's response request, the third receiving interface may respond by transmitting the response data in a point-to-point manner through a plurality of lines by using a SPI. At this time, the first receiving interface and the second receiving interface may respond by transmitting the response data through a line different from the SPI used by the third receiving interface.

According to the above, the display driving apparatus according to an embodiment may drive the display with high resolution and high frame rate by obtaining the display data and the command data, by transmitting the display data and the command data to the plurality of display driver ICs through the MIPI using the point-to-multipoint (multi-drop) manner, and by independently controlling the sub-pixels corresponding to each of the plurality of display driver ICs based on the display data and the command data.

Meanwhile, the display driving apparatus according to an embodiment may be a display driving apparatus including the plurality of display driver ICs that independently control each of the plurality of sub-pixels based on the display data and the command data, wherein the plurality of display driver ICs receive the display data and the command data through the MIPI using the point-to-multipoint (multi-drop) manner. The display driving apparatus according to another embodiment may be a display driving apparatus that further includes the host for transmitting the display data and the command data to the plurality of display driver ICs. The display driving apparatus according to another embodiment may be a display driving apparatus that further includes the display panel including the plurality of sub-pixels. The display driving apparatus according to another embodiment may be a display driving apparatus, wherein each of the plurality of display driver ICs includes the receiving interface for receiving the display data and the command data, and the logic controller controlling the sub-pixels by writing the display data and the command data.

On the other hand, the above-described method may be written as a program that may be executed on a computer, and may be implemented in a general-purpose digital computer that operates the program by using a computer-readable recording media. In addition, a structure of data used in the above method may be recorded on the computer-readable recording media through various means. The computer-readable recording media includes a storage media such as magnetic storage media (e.g., read only memory, random access memory, universal serial bus, floppy disk, hard disk, etc.), optical reading medium (e.g., compact disc read only memory, digital versatile disc, etc.).

Those skilled in the art related to the present embodiment will be able to understand that it may be implemented in a modified form within a range that does not deviate from the essential characteristics of the above description. Therefore, the disclosed methods should be considered from an explanatory point of view rather than a limiting point of view, and the scope of rights is shown in the claims rather than the foregoing description, and should be construed to include all differences within the equivalent range.

According to the problem solving means of the present disclosure described above, the present disclosure may drive the display with high resolution and high frame rate by obtaining the display data and the command data, by transmitting the display data and the command data to the plurality of display driver ICs through the MIPI using the point-to-multipoint (multi-drop) manner, and by independently controlling the sub-pixels corresponding to each of the plurality of display driver ICs based on the display data and the command data.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A data transmission method of a display driving apparatus, the data transmission method comprising:
    obtaining display data and command data;
    transmitting the display data and the command data to each of a plurality of display driver integrated circuits (ICs) through a mobile industry processor interface (MIPI) using a point-to-multipoint (multi-drop) manner; and
    independently controlling sub-pixels corresponding to each of the plurality of display driver ICs based on the display data and the command data,
    wherein the controlling comprises:
    receiving the display data and the command data by a receiving interface included in each of the plurality of display driver ICs; and
    controlling the sub-pixels by selectively writing the display data and the command data by a logic controller included in each of the plurality of display driver ICs.

2. The data transmission method of claim 1, wherein the transmitting comprises transmitting the display data and the command data to each of the plurality of display driver ICs through a single line by using the MIPI.

3. The data transmission method of claim 1, wherein
    the receiving comprises receiving selection data for selectively writing the display data and the command data, and
    the controlling comprises controlling the sub-pixels by selectively writing the display data and the command data by the logic controllers based on the selection data.

4. The data transmission method of claim 1, wherein the command data comprises:
    common command data commonly applied to an R sub-pixel, a G sub-pixel and a B sub-pixel which are included in the sub-pixels;
    first command data applied only to the R sub-pixel;
    second command data applied only to the G sub-pixel; and
    third command data applied only to the B sub-pixel.

5. The data transmission method of claim 1, further comprising responding by transmitting response data to a host by the receiving interface based on a response request of the host.

6. The data transmission method of claim 5, wherein the responding comprises responding by transmitting the response data in a bus turn around (BTA) manner by using the MIPI by the receiving interface.

7. The data transmission method of claim 5, wherein the responding comprises responding by transmitting the response data in a point-to-point manner by using a serial peripheral interface (SPI) by the receiving interface.

8. A display driving apparatus comprising:
a plurality of display driver integrated circuits (ICs) that independently control each of a plurality of sub-pixels based on display data and command data,
wherein the plurality of display driver ICs receive the display data and the command data through a mobile industry processor interface (MIPI) using a point-to-multipoint (multi-drop) manner,
wherein each of the plurality of display driver ICs comprises:
a receiving interface configured to receive the display data and the command data; and
a logic controller configured to control the sub-pixel by writing the display data and the command data.

9. The display driving apparatus of claim 8, further comprising a host transmitting the display data and the command data to the plurality of display driver ICs.

10. The display driving apparatus of claim 8, further comprising a display panel including the plurality of sub-pixels.

\* \* \* \* \*